2,938,920
Patented May 31, 1960

2,938,920
RECOVERY OF TRIALKYL BORATES FROM METAL TETRAALKOXYBORATES

George L. Cunningham and Frank Pretka, Cleveland, Ohio, assignors to Callery Chemical Company, Pittsburgh, Pa., a corporation of Pennsylvania No Drawing. Filed Dec. 1, 1955, Ser. No. 550,462

8 Claims. (Cl. 260—462)

This invention relates to a new and improved method for the recovery of trialkyl borates having the general formula $B(OR)_3$, where R is a lower alkyl radical from metal tetraalkoxyborates, and in particular relates to the recovery of trialkyl borates by the reaction of an alcoholic solution of an alkali metal or alkaline earth metal tetraalkoxyborate, $MB(OR)_4$, with carbon dioxide in the presence of an extractive solvent for the trialkyl borate formed.

The trialkyl borates such as trimethyl borate are valuable intermediates in the preparation of high energy fuels. Several methods for the preparation of the trialkyl borates have been developed. One of these methods involves the reaction of boric acid with an alcohol. Another method in general use is the reaction of borax with a large excess of an alcohol in the presence of an acid such as sulfuric acid or hydrochloric acid. Trimethyl borate is obtained as a product of the decomposition of sodium tetramethoxyborate, $NaB(OCH_3)_4$, or the disproportionation of sodium trimethoxyborohydride, $NaHB(OCH_3)_3$, at elevated temperatures. In one method for the preparation of sodium borohydride, $NaBH_4$, a considerable amount of sodium tetramethoxyborate is obtained as a by-product. This by-product must be converted to trimethyl borate in order to make the process economically attractive. It has, therefore, become important to develop a general method for converting alkali metal and alkaline earth tetraalkoxyborates into the corresponding trialkyl borates.

It is one object of this invention to provide a new and improved method for the recovery of trialkyl borates from the corresponding metal tetraalkoxyborates.

Another object is to provide a method for converting alkali metal and alkaline earth metal tetramethoxyborates into the corresponding trialkyl borates.

A further object is to provide an economical method of recovering trialkyl borates whereby alkali metal and alkaline earth metal tetraalkoxyborates dissolved in an alcohol are reacted with carbon dioxide in the presence of an extractive solvent for the trialkyl borate formed.

A still further object is to provide a simple and efficient method for converting sodium tetramethoxyborate into trimethyl borate.

Other objects will become apparent from time to time throughout the following specifications and appended claims.

This new and improved method for recovering trialkyl borates from metal tetraalkoxyborates will be more fully described hereinafter and the novelty thereof will be particularly pointed out and distinctly claimed.

This invention is based upon the discovery that when an alcoholic solution of an alkali metal or alkaline earth metal tetraalkoxyborate is carbonated a trialkyl borate is formed. When this reaction is carried out in the presence of an extractive solvent for the trialkyl borate formed, the trialkyl borate can be readily recovered by separating and distilling the solvent layer containing it.

The reaction which takes place can be illustrated as follows:

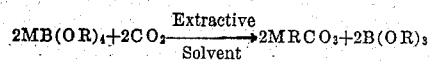

In this reaction, M represents an alkali metal or alkaline earth metal and R represents a lower alkyl radical. The extractive solvent should be miscible with the alkyl borate formed but immiscible with the by-product alkyl carbonate and the alcoholic solution being carbonated. Such solvents include perchloroethylene, trichloroethylene, vegetable oil, cottonseed oil and mineral oil. The solvent layer containing most of the trialkyl borate is separated from the alcohol layer and heated to recover the trialkyl borate. The carbonate formed is filtered from the alcohol layer and the carbon dioxide and alcohol values are recovered for further use. The process is cyclic and can be operated in a continuous manner. Suitably the carbonation reaction is carried out at room temperature.

The reaction disclosed is particularly effective in the preparation of trimethyl borate by the carbonation of a methyl alcohol solution of sodium tetramethoxyborate using perchloroethylene as the extractive solvent. The sodium methyl carbonate, $NaCH_3CO_3$, formed as a by-product is relatively insoluble in methyl alcohol—e.g., 100 g. of methyl alcohol dissolves 2.5 g. of $NaCH_3CO_3$ at 30° C. The solubility of $NaCH_3CO_3$ is even less in a methyl alcohol-trimethyl borate mixture. Thus, this compound is precipitated by the carbonation reaction. In solutions containing relatively low percentages of trimethyl borate, the removal of the solid $NaCH_3CO_3$ by filtration or other means will not remove excessive amounts of trimethyl borate from the system, but when the concentration of trimethyl borate is high, the reverse is true. The trimethyl borate adhering to the wet crystals of sodium methyl carbonate can be recovered by various methods but this involves additional operations. It has been discovered that an extractive solvent can be used to remove the trimethyl borate from the alcoholic liquid phase even when the percentage of trimethyl borate is relatively low in that phase. Such solvents include various lubricating, vegetable and mineral oils in addition to perchloroethylene and trichloroethylene. Furthermore, the solubility of $NaCH_3CO_3$ is greatly reduced in methyl alcohol solutions containing sodium tetramethoxyborate—e.g., 100 g. of a methyl alcohol solution saturated with $NaB(OCH_3)_4$ will contain less than one gram of $NaCH_3CO_3$ at 35° C. In order to increase the rate of carbonation and to increase the efficiency of the extraction of trimethyl borate, it is preferable to keep the methyl alcohol solution saturated with sodium tetramethoxyborate. We have further discovered that the solubility of $NaB(OCH_3)_4$ in methyl alcohol at 35° C. decreases rapidly as the percentage of trimethyl borate increases in the alcohol as follows:

| Mol fraction of $B(OCH_3)_3$ in $CH_3OH$ | Solubility in grams of $NaB(OCH_3)_4$ per 100 g. of solvent |
| --- | --- |
| 0.00 | 54.50 |
| 0.25 | 21.50 |
| 0.50 | 18.58 |
| 0.75 | 5.06 |
| 1.00 | 0.09 |

It is apparent from the above table that by using an extractive solvent to remove the trimethyl borate from the alcohol layer as the carbonation proceeds it is possible to maintain a higher concentration of $NaB(OCH_3)_4$ in the alcohol layer.

In order to decrease the percentage of trimethyl borate in the alcohol layer and to increase the extraction of trimethyl borate, it is preferable to run the extractive solvent countercurrent to the alcohol layer. The extracting solvent leaving the column will contain trimethyl borate in a much higher mol ratio than the alcohol layer. This extractive solvent layer can then be heated to recover first a small amount of trimethyl borate-methyl alcohol azeotrope and then a later cut of the distillation will contain substantially pure trimethyl borate. The sodium methyl carbonate formed is filtered from the slurry leaving the extracting column. Since this liquid contains only a small percentage of trimethyl borate, the wet cake of sodium methyl carbonate will remove only a small amount of trimethyl borate from the system.

In one experiment, a slurry of sodium tetramethoxyborate in methyl alcohol was fed into the top of the first of a series of three carbonating towers. Pure carbon dioxide was passed upward through the towers. The slurry from the bottom of each tower was sent to the next carbonating tower. Perchloroethylene was passed through the carbonating towers in a countercurrent fashion. The alcohol liquor in the last tower contained about one mol of methyl alcohol, 0.18 mol of $NaB(OCH_3)_4$ and 0.32 mol of trimethyl borate. The mol ratio of trimethyl borate to methyl alcohol in the liquor was 0.316. The perchloroethylene layer was distilled to recover 44.2 g. of trimethylborate-methyl alcohol azetrope containing 70% trimethyl borate and 86.7 g. of pure trimethyl borate. Thus, 73.6% of the trimethyl borate in the extracting layer was recovered as pure trimethyl borate. The mol ratio of trimethyl borate to methyl alcohol in the extracting layer was 2.74. Therefore, the ratio of trimethyl borate to methyl alcohol in the extracting layer was 8.68 times the ratio in the methyl alcohol layer.

The reaction disclosed herein has been found to be of general application for the recovery of trialkyl borates from metal tetraalkoxyborates. For economic reasons, the sodium tetraalkoxyborates are preferred as starting materials but other alkali metal and alkaline earth metal tetraalkoxyborates may be used if desired. It should, therefore, be understood that within the scope of the appended claims this invention may be practiced otherwise than as specifically described.

What we desire to claim and secure by Letters Patent of the United States is:

1. In a method of preparing tri-loweralkyl borates in which an alcoholic solution of $MB(OR)_4$, where R is a lower alkyl radical and M is selected from the group consisting of alkali and alkaline earth metals, is carbonated and produces $B(OR)_3$ and $MRCO_3$, the steps comprising carrying out said carbonating reaction in the presence of an extractive solvent which is miscible with said $B(OR)_3$ and in which said $MRCO_3$ and said alcoholic solution being carbonated are insoluble, separating the resultant solvent layer containing tri-loweralkyl borate and recovering said tri-loweralkyl borate by distillation.

2. A method according to claim 1 in which excess metal tetra lower alkoxyborate is used in the form of an alcoholic slurry.

3. A method according to claim 1 in which the carbonation reaction is carried out at about room temperature.

4. A method according to claim 1 in which the extractive solvent used is selected from the class consisting of perchloroethylene, trichloroethylene, vegetable oil, cottonseed oil and mineral oil.

5. A method according to claim 1 in which the extractive solvent is passed countercurrent to the alkyl borate formed in the reaction.

6. A method according to claim 1 in which the alcoholic solution used is a methyl alcohol solution of sodium tetramethoxyborate and the trialkyl borate recovered is trimethyl borate.

7. A method of recovering trimethyl borate from sodium tetramethoxyborate which comprises carbonating with $CO_2$, a substantially saturated methyl alcohol solution of sodium tetramethoxyborate while passing perchloroethylene countercurrent to the trimethyl borate formed, separating the two layers formed and distilling the perchloroethylene layer to recover the trimethyl borate contained therein.

8. A method according to claim 7 in which the carbonation reaction is carried out at room temperature.

References Cited in the file of this patent

Schlesinger et al.: "J. Amer. Chem. Soc.," 75, pages 186–190 (1953).

Brown et al.: "J. Amer. Chem. Soc.," 75, pages 192–195 (1953).